(12) United States Patent
Mooney et al.

(10) Patent No.: US 10,765,581 B2
(45) Date of Patent: Sep. 8, 2020

(54) SPOOL FOR WINCH ACTUATOR

(71) Applicant: Dephy, Inc., Maynard, MA (US)

(72) Inventors: Luke Mooney, Sudbury, MA (US);
Jean-Francois Duval, Belmont, MA (US); William Marvin, Canton, MA (US)

(73) Assignee: Dephy, Inc., Maynard, MA (US)

( * ) Notice: Subject to any disclaimer, the term of this patent is extended or adjusted under 35 U.S.C. 154(b) by 1 day.

(21) Appl. No.: 16/365,079

(22) Filed: Mar. 26, 2019

(65) Prior Publication Data

US 2019/0300343 A1 Oct. 3, 2019

Related U.S. Application Data

(60) Provisional application No. 62/648,576, filed on Mar. 27, 2018.

(51) Int. Cl.
*A61H 1/00* (2006.01)
*A61H 1/02* (2006.01)
(Continued)

(52) U.S. Cl.
CPC ............. *A61H 1/0237* (2013.01); *A61H 3/00* (2013.01); *B25J 9/0006* (2013.01); *B66D 1/34* (2013.01);
(Continued)

(58) Field of Classification Search
CPC .... B65H 75/28; B66D 1/34; A61H 2003/007; A61H 2201/165; A61H 2201/106; A61H 3/00; B25J 9/0006
See application file for complete search history.

(56) References Cited

U.S. PATENT DOCUMENTS 278,884 A * 6/1883 Clawson ............. E06B 9/52
160/395
2,033,905 A * 3/1936 Kingsley ................. G03C 3/00
242/586.2
(Continued)

FOREIGN PATENT DOCUMENTS

JP 2011092507 A 5/2011
WO WO-2007097649 A1 * 8/2007 ............. B60P 7/083
(Continued)

OTHER PUBLICATIONS

Mooney and Herr; Journal of NeuroEngineering and Rehabilitation (2016) 13:4; "Biomechanical walking mechanisms underlying the metabolic reduction caused by an autonomous exoskeleton", pp. 1-12; Published Jan. 28, 2016.

(Continued)

*Primary Examiner* — Emmanuel M Marcelo
(74) *Attorney, Agent, or Firm* — Barlow, Josephs & Holmes, Ltd.

(57) ABSTRACT

A spool assembly and method of use is disclosed having generally a first and a second mating portions which can mate along a longitudinal axis of the spool to retain a belt therein. The mating surfaces of the first and second mating portions can take a variety of geometries or splines which can efficiently retain the belt while maintaining a suitable transmission ratio. In an exemplary embodiment, the spool exit curve for the retained belt can be radially inward of a majority of the spool to reduce the overall diameter of the spool. In some exemplary embodiments, the spool can be mounted within a motor and rotated thereby to spool and unspool the belt.

15 Claims, 4 Drawing Sheets

(51) Int. Cl.
  *B25J 9/00* (2006.01)
  *A61H 3/00* (2006.01)
  *B66D 1/34* (2006.01)

(52) U.S. Cl.
  CPC .. *A61H 2003/007* (2013.01); *A61H 2201/165* (2013.01); *A61H 2205/106* (2013.01)

(56) References Cited

U.S. PATENT DOCUMENTS

| | | | | |
|---|---|---|---|---|
| 2,584,099 | A * | 1/1952 | Harkrader | B66D 1/34 242/602.2 |
| 3,304,021 | A * | 2/1967 | Quenot | G01B 3/1056 242/586.2 |
| 3,463,411 | A * | 8/1969 | Brown | G03B 21/326 242/586.2 |
| 3,885,751 | A * | 5/1975 | Kelch | B65H 75/04 242/586.2 |
| 4,967,976 | A * | 11/1990 | Kawai | B60R 22/34 242/376 |
| 4,974,788 | A * | 12/1990 | Covington | B65H 75/28 242/586.2 |
| 5,167,378 | A * | 12/1992 | Johanson | G11B 23/08728 242/586.2 |
| 5,346,153 | A * | 9/1994 | Ebey | B66D 1/34 242/579 |
| 5,363,025 | A | 11/1994 | Coiling | |
| 5,647,551 | A * | 7/1997 | Ikeda | G11B 15/674 242/345 |
| 6,609,671 | B2 * | 8/2003 | Heesch | A01K 89/0111 242/322 |
| 8,235,924 | B2 | 8/2012 | Bachmann et al. | |
| 8,394,038 | B2 | 3/2013 | Ashihara et al. | |
| 8,516,918 | B2 | 8/2013 | Jacobsen et al. | |
| 8,702,811 | B2 | 4/2014 | Ragnarsdottir et al. | |
| 8,731,716 | B2 | 5/2014 | Jacobsen et al. | |
| 8,771,370 | B2 | 7/2014 | Albrecht-Laatsch et al. | |
| 8,852,292 | B2 | 10/2014 | Ragnarsdottir et al. | |
| 8,894,592 | B2 | 11/2014 | Amundson et al. | |
| 9,445,931 | B2 | 9/2016 | Imaida et al. | |
| 2003/0188833 | A1 * | 10/2003 | Adleman, Jr. | B29C 63/0013 156/763 |
| 2006/0211966 | A1 | 9/2006 | Hatton et al. | |
| 2009/0222105 | A1 | 9/2009 | Clausen | |
| 2010/0076360 | A1 | 3/2010 | Shimada et al. | |
| 2010/0130893 | A1 | 5/2010 | Sankai | |
| 2010/0256538 | A1 | 10/2010 | Ikeuchi | |
| 2012/0074364 | A1 * | 3/2012 | Ouellette | B66D 1/34 254/266 |
| 2012/0283845 | A1 | 11/2012 | Herr et al. | |
| 2013/0012852 | A1 | 1/2013 | Imaida et al. | |
| 2013/0102934 | A1 | 4/2013 | Ikeuchi | |
| 2013/0270498 | A1 * | 10/2013 | Burneister | B66D 1/7452 254/266 |
| 2014/0330431 | A1 | 11/2014 | Hollander et al. | |
| 2015/0173993 | A1 | 6/2015 | Walsh et al. | |
| 2015/0209214 | A1 | 7/2015 | Herr et al. | |
| 2015/0374573 | A1 | 12/2015 | Horst et al. | |
| 2016/0331557 | A1 | 11/2016 | Tong et al. | |
| 2017/0349415 | A1 * | 12/2017 | Kinjarapu | E02F 3/50 |

FOREIGN PATENT DOCUMENTS

| | | | |
|---|---|---|---|
| WO | 2010091377 | A2 | 8/2010 |
| WO | 2016164395 | A2 | 10/2016 |

OTHER PUBLICATIONS

Mooney et al., Journal of Neuroengineering and Rehabilitation 2014, 11:151; "Autonomous exoskeleton reduces metabolic cost of human walking"; Published Nov. 3, 2014.

Twist. Merriam Webster Online Dictionary, definition 1C, https://www.merriam-webster.com/dictionary/twist; Dec. 20, 2017.

* cited by examiner

SPOOL FOR WINCH ACTUATOR

CROSS-REFERENCE TO RELATED APPLICATION

This patent document claims benefit of earlier filed U.S. Provisional Patent Application No. 62/648,576, filed on Mar. 27, 2018, the entire contents of which are incorporated herein by reference.

GOVERNMENT SUPPORT

This invention was made with government support under W911QY-16-C-0072 from the United States Army.

BACKGROUND OF THE INVENTION

The invention relates generally to an advantageous spool design, for example for a belt driven robotic actuator. In general, in belt driven actuators, an actuator exerts a tensile force via a belt that winds around a spool during actuation.

In one exemplary embodiment, the application of this device generally relates to exoskeletons, a device worn by a person to augment physical abilities, where mass and form factor are of high importance. It is desirable for exoskeletons to be as lightweight as possible, since the user must carry and move the device along with the body. It is also desirable for these devices to be capable of providing large amounts of force, torque and/or power to the human body in order to assist with motion. Furthermore, the device should not interfere with the natural range of motion of the body imposing additional device form factor and actuator constraints.

In passive exoskeletons, where there is no electrical control, it is desirable to have linear application of force/torque from mechanical systems so that the user experiences a smooth interaction with the mechanism. In active exoskeletons, where there is electronic control and/or actuation, it is desirable to have a linear application of force/torque. This force/torque must be repeatable and predictable to consistently model and control an exoskeleton system.

Since DC motors suited to use in wearable and/or mobile robotic applications have low toque output but high speeds, a high transmission ratio is needed to increase the torque of the mechanism. It is important to implement this transmission in a way that minimizes increase in mass while maintaining a suitable form factor. When designing a spool for this application, a spool that has a small diameter increases the transmission ratio. It also has a low mass and volume which reduces the size and mass of the assembly.

Wire rope or cord has been used effectively for similar applications, however, belts have certain advantages over wire ropes. A wire rope requires a consistent winding pattern that prevents the wire from tangling or jamming itself. This is accomplished with some sort of spooling guide that typically increases the complexity of the mechanism. The wire rope is also subject to tangling when tension is removed, therefore tension must be maintained either mechanically or operationally. Because of the flat nature of a belt, it can be wrapped around itself without tangling removing the need for a spooling guide. This also means the belt does not have to remain in tension which reduces mechanism complexity and/or reduces operational complexity.

When using a spool to transmit force the belt or cord will undergo curvature when winding. This tensile members in a cord are typically twisted or braided. This has the effect of different bend radii between the inner and outer fibers. To avoid rubbing of these fibers on one another a large spool diameter is required. Belts typically have tensile members in one plane reducing the need for a large diameter spool.

The unique requirements of the robotic exoskeletons including low mass, high force/torque/power, specific form factor, and linear application of force/torque create unique design challenges that prior art has not addressed.

SUMMARY OF THE INVENTION

The present invention preserves the advantages of prior art spool devices. In addition, it provides new advantages not found in currently available devices and overcomes many disadvantages of such currently available devices. The invention is applied generally to a robotic exoskeleton where unique control, form factor, and mass requirements exist.

The present invention is a unique two-part spool design used to transmit an input torque to a mechanism via a tension force in a belt. This can be used directly in applications where a linear output force is desired or, indirectly via a moment arm in applications where an output torque is desired.

This spool has the advantage of over similar pulley type mechanisms because it does not always have to maintain the belt under tension. The present invention does not require any dynamic spooling guide, has a smaller stack height, has a smaller spool diameter, and applies zero force when tension is removed. The mechanism can easily be adjusted to change mechanical advantage by changing spool diameter, or moment arm length, and can provide high force amplification because the spool diameter can be very small. Since the device is pulling a belt, a wide range of angular misalignment can be tolerated.

It is therefore an object of the present invention to provide a new and novel belt spool design that is compact, lightweight, and inexpensive to manufacture, yet is strong and easy to implement in a mechanism. This solves the problems associated with prior art belt spool designs.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE INVENTION

Figure 1:
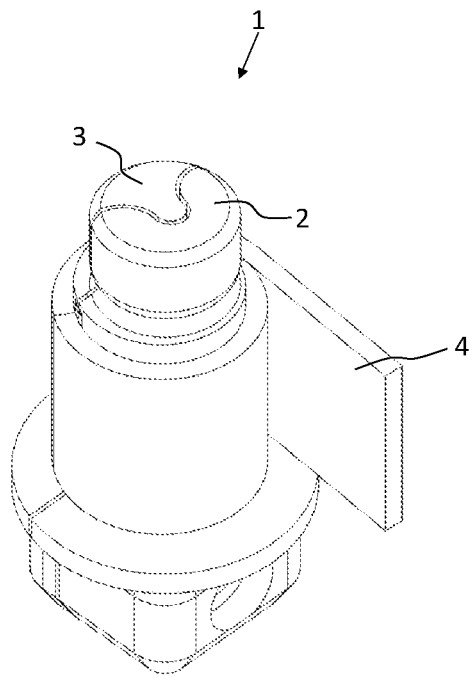
FIG. 1 shows a perspective view of a spool according to an exemplary embodiment.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like proximal, distal, top, bottom, up, or down are used, they are not intended to limit the systems, devices, and methods disclosed herein. A person skilled in the art will recognize that these terms are merely relative to the system and device being discussed and are not universal.

DC motors, like those used in exoskeletons, are suited to applications where there is a need for low toque output but high speeds, a high transmission ratio is needed to increase the torque of the mechanism. It can be important to implement such a transmission in a way that minimizes the increase in mass while maintaining a suitable form factor. When designing a spool for this application, a spool that has a small diameter, like the one shown in FIGS. 1-8 can increase the transmission ratio and can have a low mass and volume which reduces the size and mass of the assembly.

In general, the spool illustrated in FIGS. 1-8 can generally include a first and a second mating portion which can mate along a longitudinal axis of the spool to retain a belt therein. The mating surfaces of the first and second mating portions can take a variety of geometries or splines which can efficiently retain the belt while maintaining a suitable transmission ratio. In an exemplary embodiment, the spool exit curve for the retained belt can be radially inward of a majority of the spool to reduce the overall diameter of the spool, as will be discussed further below. In some exemplary embodiments, the spool can be mounted within a motor and rotated thereby to spool and unspool the belt.

Referring to FIGS. 1-8 an exemplary embodiment of the instant spool is illustrated. FIG. 1 illustrates a spool 1 shown retaining a belt 4 clamped between a first spool part 2 and a second spool part 3 to form the spool assembly 1. The belt 4 can then be wound around the mated first and second spool parts 2, 3 to shorten the effective length of the belt 4, as shown in FIGS. 1 and 7A-7C. As illustrated in FIG. 1, the belt is shown wrapped approximately one revolution around the spool 1.

A belt can be considered to be a material that has a smaller height than width and is intended to be put under tension through its length. In its simplest form a belt is made from a single material. A belt can also be made of multiple materials to improve its strength, friction, bending, or efficiency properties. In some exemplary embodiments, a belt can be used in a high tension application and can have embedded tensile members, such as polyester fibers, built into them. Belt applications can require a belt with a low coefficient of friction to avoid slipping, for example a low friction belt can be coated in a low friction material like PTFE or Nylon. Low friction belt increases the efficiency of the mechanism. A typical belt used for a robotic winch actuator will be less than 2 mm in thickness and less than 50 mm in width. High strength fibers are used in the belt to withstand forces over 1000 N. In alternative embodiments, the instant spool assembly can be used with any type of belt, rope, wire, or other known belt type.

Figure 2:
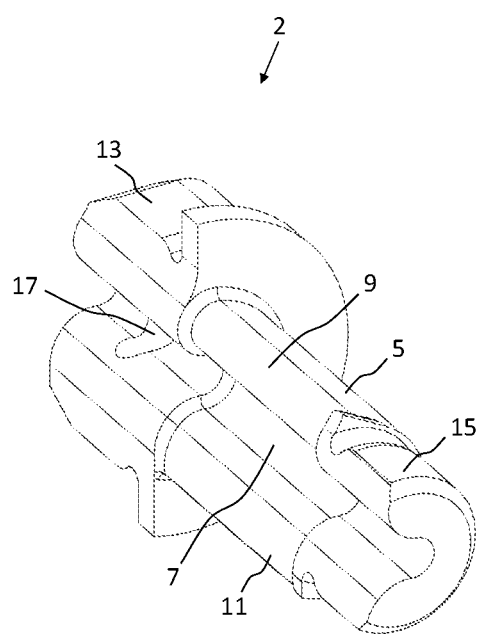
FIG. 2 is a left perspective view of a first spool part of the spool of FIG. 1.
Figure 3:
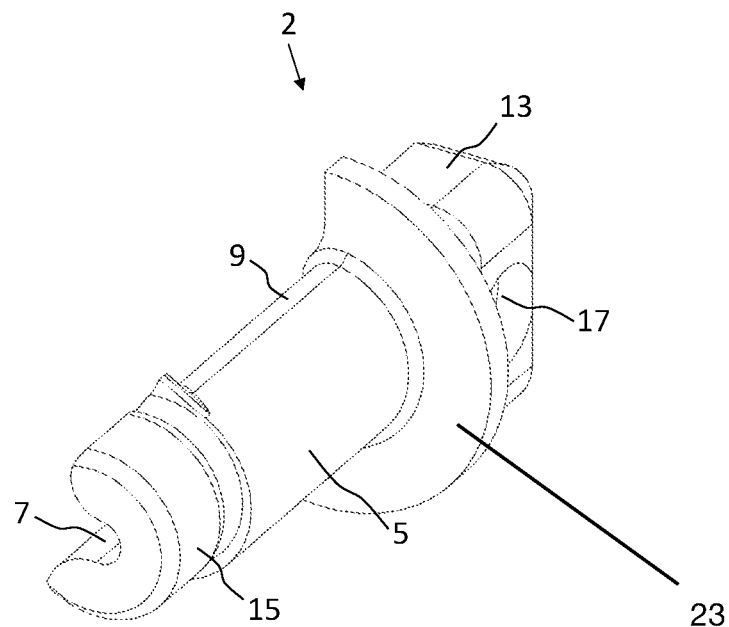
FIG. 3 is a right perspective view of the first spool part of the spool of FIG. 1.
Figure 4:
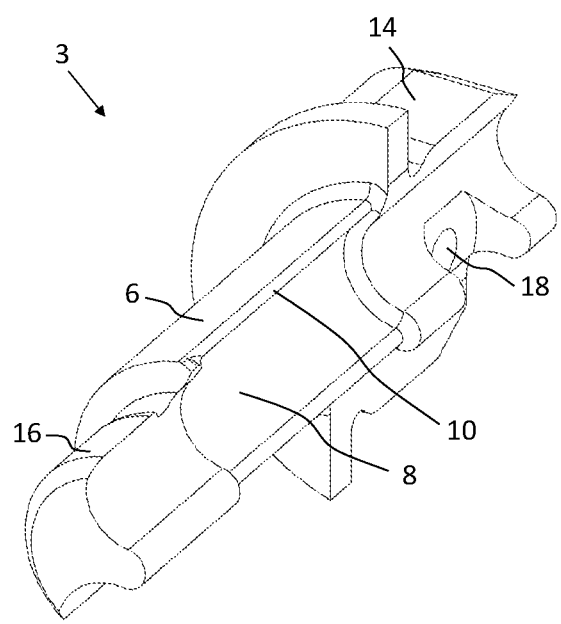
FIG. 4 is a right perspective view of a second spool part of the spool of FIG. 1.
Figure 5:
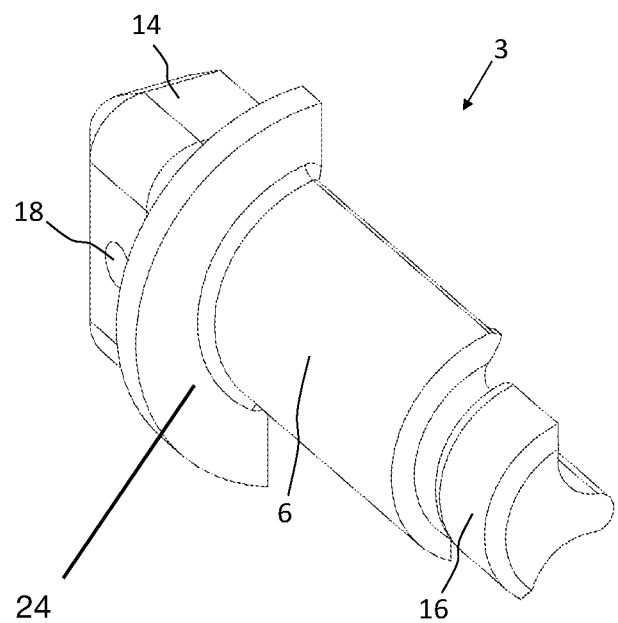
FIG. 5 is a left perspective view of the second spool of the spool of FIG. 1.

The spool can be composed of two parts: a first spool part 2, as shown in FIGS. 2 and 3, and second spool part 3, as shown in FIGS. 4 and 5. The two spool parts 2, 3 can have complementary clamping faces 7, 8 and outer winding faces 5, 6. For example, the clamping face 7 of the first spool part 2 and the clamping face 8 of the second clamping face 8 can have complementary geometries that can fit within one another. Such a configuration of the clamping faces 7, 8, can serve at least two purposes: first to retain the belt 4 therebetween and second to transmit rotational forces applied to the spool 1. The clamping faces 7, 8 can be offset from each other by a distance which is approximately the same as the belt 4 thickness to clamp the belt 4 in the spool assembly 1. The winding faces 5, 6 can define the surface around which the belt 4 is wound around the spool assembly 1 during the actuation of the spool.

In some embodiments, the first and second spool parts 2, 3 can be milled from a rigid material such as a metal or plastic. The first and second spool parts 2, 3 can, alternatively, be cast, molded, or printed depending on the required material properties. In some embodiments, the first and second spool parts are manufactured from the same material or two different materials.

As shown in FIGS. 2 and 3, the first spool part 2 is shown. The first spool part 2 can be described as having three general regions, the first spool winding face 5, a first spool mounting surface 13, and a first spool bearing mount surface 15. The first spool winding face 5 can be disposed between the first spool mounting surface 13 and the first spool bearing mount surface 15. In some embodiments, a collar 23 can be disposed on one end of the first spool winding face 5 to guide the belt 4 during at least the first rotation of the spool 1. As shown, the first spool winding face 5 has a non-constant outer diameter. The first spool part clamping face 7 can be defined between a first spool part exit curve 9 (proximate point D) and a first spool part terminal area (proximate point H). In some embodiments, a first spool fastener hole 17 can be disposed in the first spool part mounting surface 13 to cooperate with a pin 20 to retain the first and second spool parts 2, 3 together.

As shown in FIGS. 4 and 5, the second spool part 3 is shown. Similar to the first spool part 2, the second spool part 3 can be described as having three general regions, the second spool winding face 6, a second spool mounting surface 14, and a second spool bearing mount surface 16. The second spool winding face 6 can be disposed between the second spool mounting surface 14 and the second spool bearing mount surface 16. As shown, the second spool winding face 6 has a constant outer diameter. In some embodiments, a collar 24 can be disposed on either end of the second spool winding face 6 to guide the belt 4 during at least the first rotation of the spool 1. The second spool part clamping face 8 can be begin with a second spool part exit curve 10 (proximate point B) and a second spool part terminal area (proximate point J). In some embodiments, a second spool fastener hole 18 can be disposed in the second spool part mounting surface 14 to cooperate with a pin 20 to retain the first and second spool parts 2, 3 together.

Figure 6:
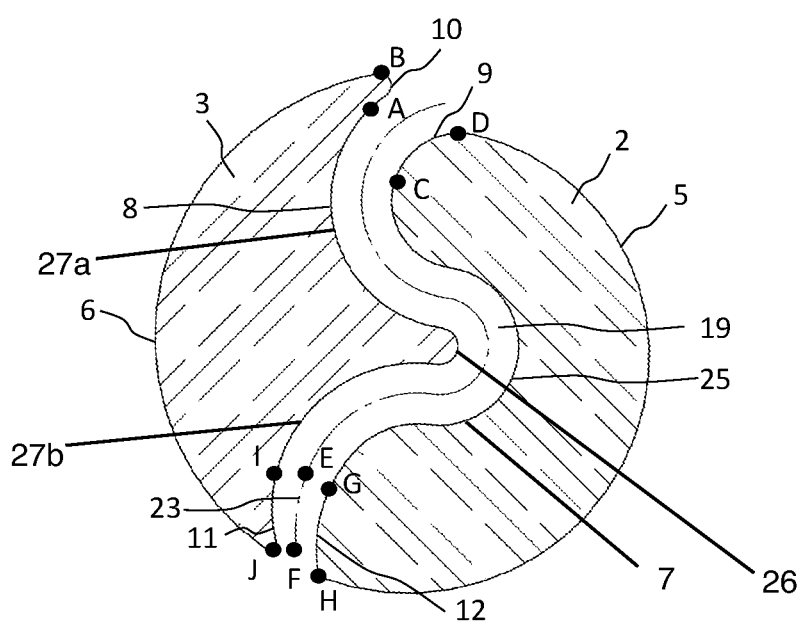
FIG. 6 is a cross-sectional view of the first and second spool part of FIG. 1.
Figures 7A, 7B, 7C:
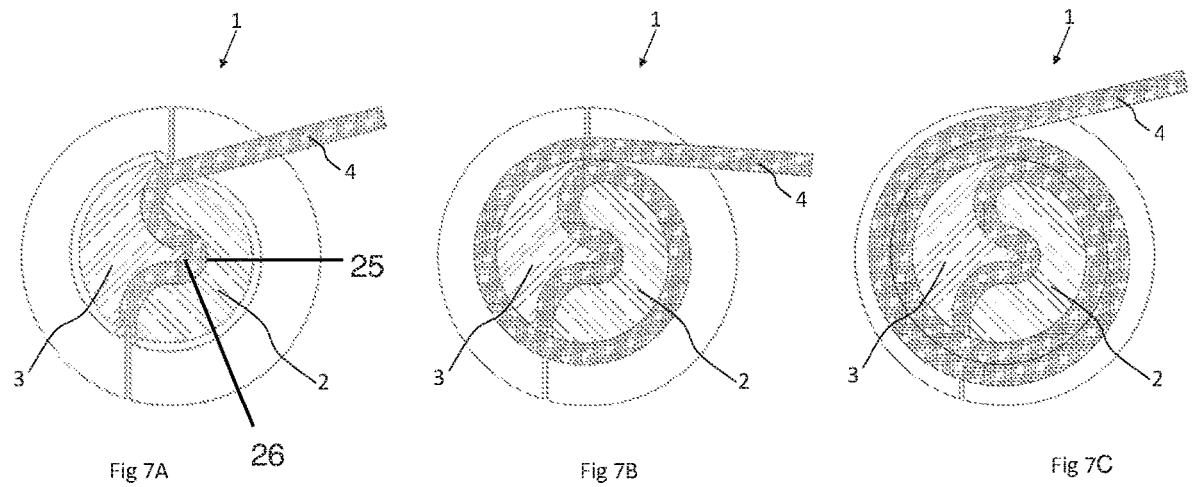
FIGS. 7A-7C are cross-sectional views of the spool assembly of FIG. 1 showing a belt being wound.
Figure 8:
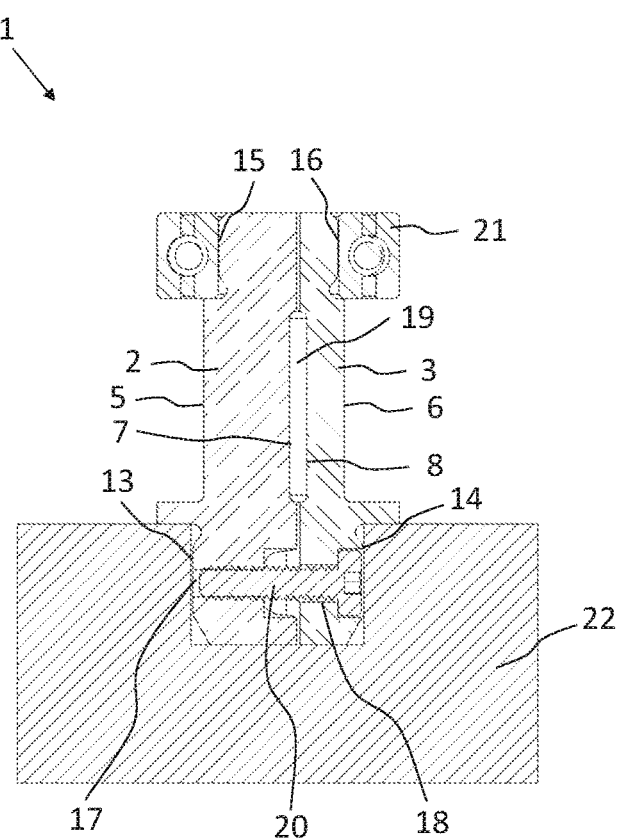
FIG. 8 is a cross-sectional view of the spool assembly of FIG. 1 installed in a motor.

FIG. 6 depicts the design of the clamping curve 19 which defines the area between the first and second clamping faces 7, 8. The clamping curve 19 can be defined by three semi-circular splines which creates a path of high friction when the belt 4 is clamped between the two clamping faces 7, 8, as shown in at least FIGS. 7A-7C. In an alternative embodiment, the clamping curve 19 can be a single semi-circle, a double semi-circle, an asymmetric or symmetric curve, or any linear or curved shape. In the illustrated embodiment, the first spool clamping face 7 can have a generally concave central portion extending to a vertex 25, defined between points C & G. In some embodiments, the first spool clamping face 7 can have a generally sinusoidal shape or parabolic shape. The second spool clamping face 8 can have a generally convex shape defined between point C & G. As shown, the second spool clamping face 8 can have a shape size and arranged to be received at least partially within the first clamping face 7. The geometry of the second spool clamping face 8 can similarly be generally parabolic and convex such that a vertex 26 is disposed between two circular arcs 27a, 27b. In some embodiments, the diameter of the vertex 26 of the second spool clamping face 8 can be smaller than the diameter of the vertex 25 of the first spool clamping face 7. This geometry of the first and second clamping faces 7, 8 can secure the belt 4 in the spool assembly 1 and utilizes the capstan effect to increase the holding force of the mechanism 1. The biting curve 23, shown as defined between points E and F, of FIG. 6, can consists of a slight decrease in the clamping gap 19 and compresses the belt 4 to better hold it in the spool assembly 1. In some embodiments, the clamping gap 19 can extend along the central axis of the spool 1, or in some embodiments, as illustrated in FIG. 8, the clamping gap can extend along only a portion of the spool. As illustrated in FIG. 6, the gap distance between points J and H is smaller than the distance between points I and G. The biting curve 23 can be created by the first and second spool part terminal areas 11, 12 which can be located between points G and H and points I and J respectively. In an alternative, or in addition, to further increase the holding force of the spool 1, an adhesive can be applied to the clamping faces 7-8 or the belt 4 prior to clamping.

In FIGS. 6 and 7A-7C, it can be seen that first and second spool parts 2, 3 utilize the winding faces 5, 6 to form a spiral with the belt 4. This spiral of the belt 4 can allow the belt 4 to be wound around the spool assembly 1 in a constant pitch spiral. The first spool exit curve 9, defined by points C & D and the second spool exit curve 10, defined by points A & B, can form a step that allows the belt to wrap onto itself without a discontinuity in effective spool radius. Thus, point D can be offset a smaller distance from the center of the spool 1 than point A. For example, the difference in distance from the center between points A and D can be approximately the thickness of the belt 4. The step can be seen in at least FIGS. 7B & 7C. The first spool part exit curve 9 can permit the belt 4 to smoothly exit the clamping gap 19 without losing contact with first second spool part 2, 3. The step at the exit curve 9 can additionally minimize the diameter of the spool which can, in some embodiments aid in minimizing the length of an associated lever arm of an exoskeleton to increase the associated mechanical advantage. The radius of curvature of the exit curve 9 can be maximized to reduce bending fatigue of the belt 4. The radius of curvature of exit curve 10 can be minimized. In a preferred embodiment, the radius of curvature of exit curve 10 can be minimized without creating a sharp edge. Minimizing the radius of curvature of exit curve 10 can aid in maintain a continuous change in radius. Such an exoskeleton can be the exoskeleton disclosed in U.S. application Ser. No. 15/782,306, entitled "Unidirectional Actuated Exoskeleton Device," filed Oct. 12, 2017, incorporated herein in its entirety. While only one wrap of the belt 4 is shown, the belt 4 can be wrapped around the spool any number of times. Moreover, the procedure for unwrapping the belt 4 is to drive the spool 1 in reverse. The spool 1 is configured to prevent the belt 4 from being unclamped from the spool 1, even when the belt 4 is fully unwrapped from the spool. In effect the spool 1 is designed to resist unclamping in an assembled state.

FIG. 8 illustrates the spool assembly 1, without the belt 4, being held together with a fastener 20. In the illustrated embodiment, one fastener 20 is used to hold the first and second spool parts 2, 3 together. In some embodiments, the fastener can be a threaded screw. Alternatively, a second fastener can be used on the opposing end of the spool assembly 1. In a further alternative embodiment, the spool can be retained together by mating structure 22 without the use of any fasteners. The spool assembly 1 can be inserted into a mating structure 22, which could be used to exert a torque on the spool assembly 1 and wind the belt 4. Such a mating structure can be a motor, gear, pulley, etc. In a preferred embodiment, a bearing 21 can be disposed on the other end of the spool assembly 1 apply a force which can be applied to constrain the first and second spool parts 2, 3 from separating apart. In an alternative embodiment, a simple cap or similar structure could also be used instead of the bearing 21.

It will be appreciated by those skilled in the art that various changes and modifications can be made to the illustrated embodiments without departing from the spirit of the present disclosure. All such modifications and changes are intended to be covered by the appended claims.

What is claimed is:

1. A spool assembly for a winch actuator, the spool assembly including,
  a spool extending along a central axis, the spool including
    a first spool part extending along the central axis having a first clamping face and a first exit curve defining an end of the first clamping face; and
    a second spool part extending along the central axis, the second spool part having a second clamping face and a second exit curve defining an end of the second clamping face; and
  a belt disposed between the first spool part and the second spool part,
  wherein the first clamping face and the second clamping face are offset from one another to define a clamping gap for the belt, and
  wherein the first exit curve is disposed a first distance from the central axis and the second exit curve is disposed a second distance from the central axis, the first distance being smaller than the second distance.

2. The spool assembly of claim 1, wherein the first exit curve and the second exit curve are disposed on opposite sides of the belt, at a same length of the belt.

3. The spool assembly of claim 1, wherein the first clamping face has a generally concave portion and the second clamping face has a generally convex portion, wherein the generally concave portion of the first clamping face at least partially receives the generally convex portion of the second clamping face.

4. The spool assembly of claim 1, wherein the spool is configured to resist unclamping of the belt when the belt is unwound from the spool.

5. The spool assembly of claim 1, wherein the belt is a low friction belt.

6. The spool assembly of claim 1, wherein the gap between the first clamping face and the second clamping face can be a third distance along a majority of the gap and a fourth distance along a minority of the gap.

7. The spool assembly of claim 6, wherein the fourth distance is smaller than the third distance.

8. The spool assembly of claim 6, wherein the belt is compressed when retained in the third distance.

9. The spool assembly of claim 8, wherein the belt is compressed at a first end of the belt, the belt can wind through the remainder of the gap to exit at the first and second exit curve from the spool.

10. The spool assembly of claim 1, wherein the first spool part and the second spool part are made of the same material.

11. A spool assembly for a winch actuator, the spool assembly including,
a spool extending along a central axis, the spool including
a first spool part extending along the central axis having a first clamping face and a first exit curve; and
a second spool part extending along the central axis, the second spool part having a second clamping face and a second exit curve;
a belt disposed between the first spool part and the second spool part, and
a bearing disposed on a first end of the spool and a mating structure disposed on a second end of the spool,
wherein the first clamping face and the second clamping face are offset from one another to define a clamping gap for the belt, and
wherein the first exit curve is disposed a first distance from the central axis and the second exit curve is disposed a second distance from the central axis, the first distance being smaller than the second distance.

12. The spool assembly of claim 11, further comprising a fastener retaining the first and second spool parts together.

13. The spool assembly of claim 12, wherein the fastener is a threaded screw received perpendicular to the central axis in the second end of the spool.

14. A spool assembly for a winch actuator, the spool assembly including,
a spool extending along a central axis, the spool including
a first spool part extending along the central axis having a first clamping face and a first exit curve; and
a second spool part extending along the central axis, the second spool part having a second clamping face and a second exit curve; and
a belt disposed between the first spool part and the second spool part,
wherein the first clamping face and the second clamping face are offset from one another to define a clamping gap for the belt,
wherein the first exit curve is disposed a first distance from the central axis and the second exit curve is disposed a second distance from the central axis, the first distance being smaller than the second distance,
wherein the first spool part has a first outer winding surface having a non-constant diameter, and
wherein the second spool part as a second outer winding surface having a constant diameter.

15. The spool assembly of claim 14, wherein in a first wound configuration, the belt is wrapped 360 degrees around the belt such that the belt, at the first and second exit curves, is disposed at the same distance from the central axis as the second outer winding surface.

* * * * *